(12) United States Patent
Choi

(10) Patent No.: US 11,547,206 B2
(45) Date of Patent: Jan. 10, 2023

(54) FOLDABLE SUPPORTING FRAME HAVING INDEPENDENTLY ROTATABLE LEGS

(71) Applicant: Inno-Sports Co., Ltd., Xiamen (CN)

(72) Inventor: Kwan Jun Choi, Xiamen (CN)

(73) Assignee: Inno-Sports Co., Ltd., Xiamen (CN)

( * ) Notice: Subject to any disclaimer, the term of this patent is extended or adjusted under 35 U.S.C. 154(b) by 28 days.

(21) Appl. No.: 17/084,060

(22) Filed: Oct. 29, 2020

(65) Prior Publication Data

US 2021/0196040 A1 Jul. 1, 2021

(30) Foreign Application Priority Data

Dec. 25, 2019 (CN) .......................... 201922368215.X
Dec. 25, 2019 (CN) .......................... 201922369988.X

(51) Int. Cl.

| F16M 13/00 | (2006.01) |
|---|---|
| A47B 3/091 | (2006.01) |
| F16B 12/32 | (2006.01) |
| F16B 12/20 | (2006.01) |
| F16B 12/44 | (2006.01) |

(52) U.S. Cl.
CPC ............ *A47B 3/0915* (2013.01); *F16B 12/20* (2013.01); *F16B 12/32* (2013.01); *F16B 12/44* (2013.01)

(58) Field of Classification Search
CPC .......... F16B 12/20; F16B 12/32; F16B 12/44; A47B 3/0915
See application file for complete search history.

(56) References Cited

U.S. PATENT DOCUMENTS

| 1,901,887 | A | * | 3/1933 | Allerding | ............. A47B 3/0912 108/160 |
|---|---|---|---|---|---|
| 3,044,080 | A | * | 7/1962 | Hartwig | ................ A47C 17/68 5/112 |
| 3,387,572 | A | * | 6/1968 | Ulrich | ..................... A47B 3/04 108/34 |
| 4,889,300 | A | * | 12/1989 | Gibson | .................. B65B 67/12 248/101 |
| D422,391 | S | * | 4/2000 | Whitlock | ......................... D34/6 |
| 6,076,782 | A | * | 6/2000 | Alderman | ........... B65B 67/1205 248/97 |
| 6,439,133 | B1 | * | 8/2002 | Jaramillo | ........... A47B 21/0314 108/44 |
| 6,651,568 | B1 | * | 11/2003 | Buono | ................. A47B 3/0915 108/127 |
| 6,694,897 | B2 | * | 2/2004 | Lou-Hao | ................ A47B 13/08 108/132 |
| 7,066,432 | B2 | * | 6/2006 | Wood | .................... B65F 1/1415 248/150 |

(Continued)

*Primary Examiner* — Amy J. Sterling
(74) *Attorney, Agent, or Firm* — Morgan, Lewis & Bockius LLP

(57) ABSTRACT

A foldable supporting frame includes an upper frame and a plurality of legs disposed below the upper frame when unfolded to support the upper frame. The upper frame includes a plurality of bars, with adjacent bars in the plurality of bars coupled to each other or integrally formed with each other at their adjacent end portions. Each of the plurality of legs is coupled with a corresponding bar in the plurality of bars and independently rotatable about an axis defined by the corresponding bar. When folded, the plurality of legs is disposed in an interior defined by the upper frame.

20 Claims, 14 Drawing Sheets

(56) References Cited

U.S. PATENT DOCUMENTS

| | | | | |
|---|---|---|---|---|
| 7,757,617 | B2 * | 7/2010 | Larcom | A47B 3/0916 108/174 |
| D649,378 | S * | 11/2011 | Rogers | D6/708.16 |
| 8,302,540 | B1 * | 11/2012 | Niermeyer | A47B 3/0818 108/127 |
| 9,532,644 | B2 * | 1/2017 | Nye | A47B 3/08 |
| 10,405,645 | B1 * | 9/2019 | Liu | A47B 3/0818 |
| 2003/0172855 | A1 * | 9/2003 | Wen | A47B 3/0915 108/125 |
| 2008/0276375 | A1 * | 11/2008 | Gehrke | A47C 20/021 5/648 |
| 2009/0178195 | A1 * | 7/2009 | Zheng | A47C 19/126 5/111 |

* cited by examiner

FOLDABLE SUPPORTING FRAME HAVING INDEPENDENTLY ROTATABLE LEGS

CROSS-REFERENCE TO RELATED APPLICATIONS

The present application claims priority to Chinese Utility Model Applications CN 201922368215.X filed Dec. 25, 2019 and CN 201922369988.X filed Dec. 25, 2019. The disclosure of each application is incorporated herein for all purposes by reference in its entirety.

FIELD OF THE INVENTION

The present invention generally relates to supporting frames and, in particular, to foldable supporting frames having independently rotatable supports.

BACKGROUND

A typical table usually includes a panel and a supporting frame to support the panel. In many existing tables, the panel and supporting frame are connected to each other by screws or snap fittings. Such connections are relatively complex. Tables with such connections are often difficult to fold and unfold, and thus are inconvenient to use. Some tables are not foldable and thus require larger spaces for storage.

Given the current state of the art, there remains a need for supporting frames and tables that address the abovementioned issues.

The information disclosed in this Background section is provided for an understanding of the general background of the invention and is not an acknowledgement or suggestion that this information forms part of the prior art already known to a person skilled in the art.

SUMMARY OF THE INVENTION

The present disclosure provides supporting frames and tables that are simple, foldable and easy to use.

In various exemplary embodiments, the present disclosure provides a foldable supporting frame including an upper frame and a plurality of legs disposed below the upper frame when unfolded to support the upper frame. The upper frame includes a plurality of bars, with adjacent bars in the plurality of bars coupled to each other or integrally formed with each other at their adjacent end portions. Each of the plurality of legs is coupled with a corresponding bar in the plurality of bars and independently rotatable about an axis defined by the corresponding bar. When folded, the plurality of legs is disposed in an interior defined by the upper frame.

In some exemplary embodiments, the plurality of bars includes first, second, third and fourth bars disposed at first, second, third and fourth sides of the upper frame, respectively. The plurality of legs includes first, second, third and fourth legs. The first leg has an upper end coupled with the first bar and is independently rotatable about a first axis defined by the first bar. The second leg has an upper end coupled with the second bar and is independently rotatable about a second axis defined by the second bar. The third leg has an upper end coupled with the third bar and is independently rotatable about a third axis defined by the third bar. The fourth leg has an upper end coupled with the fourth bar and is independently rotatable about a fourth axis defined by the fourth bar.

In some exemplary embodiments, each of the first, second, third and fourth bars has a length substantially the same as others.

In some exemplary embodiments, the upper frame has a substantially square shape.

In an exemplary embodiment, when folded, the first, second, third and fourth legs collectively form a substantially square shape within the square shape of the upper frame.

In some exemplary embodiments, the foldable supporting frame further includes a plurality of couplers to couple the plurality of legs with the upper frame. Each respective coupler in the plurality of couplers includes a rotating portion rotatably coupled with a corresponding bar in the plurality of bars and a fixation portion fixedly coupled or integrally formed with the upper end portion of a corresponding leg in the plurality of legs.

In some exemplary embodiments, at least a portion of the corresponding bar is circular, and the rotating portion of the respective coupler sleeves on the circular portion of the corresponding bar.

In some exemplary embodiments, the rotating portion of the respective coupler includes a split ring, a pair of semi-cylindrical shells, or a tube sleeving on the circular portion of the corresponding bar.

In an exemplary embodiment, the pair of semi-cylindrical shells is coupled with each other through one or more lugs formed at each semi-cylindrical shell.

In some exemplary embodiments, the rotating portion of the respective coupler includes a slot on a side wall thereof, wherein the slot is operably coupled with a guiding post at the corresponding bar to prevent the respective coupler from sliding along a length of the corresponding bar and to guide rotation of the corresponding leg about the axis defined by the corresponding bar.

In an exemplary embodiment, the rotating portion of the respective coupler includes ribs on an interior circumferential surface of the rotating portion of the respective coupler to assist in rotation of the corresponding leg about the axis defined by the corresponding bar.

In some exemplary embodiments, the fixation portion of the respective coupler is inserted into the upper end portion of the corresponding leg, or the upper end portion of the corresponding leg is inserted into the fixation portion of the respective coupler.

In an exemplary embodiment, the adjacent end portions of adjacent bars in the plurality of bars are welded together.

In some exemplary embodiments, the adjacent end portions of adjacent bars in the plurality of bars are connected by a plurality of corner joints.

In some exemplary embodiments, each respective corner joint in the plurality of corner joins has a first end portion inserted into one of the adjacent end portions of adjacent bars in the plurality of bars and a second end portion sleeved on the other of the adjacent end portions of adjacent bars in the plurality of bars.

In an exemplary embodiment, the first end portion of each respective corner joint and the one of the adjacent end portions of adjacent bars in the plurality of bars are fixedly coupled with each other by a first fastener through holes formed thereof. The second end portion of each respective corner joint and the other of the adjacent end portions of adjacent bars in the plurality of bars are fixedly coupled with each other by a second fastener through holes formed thereof.

In some exemplary embodiments, the foldable supporting frame further includes a plurality of couplers to couple the plurality of legs with the upper frame. Each respective coupler in the plurality of couplers includes a rotating portion sleeved on a corresponding bar in the plurality of bars at a position where the first end portion of a corner joint and the end portion of the corresponding bar are fixedly coupled. The rotating portion of the respective coupler includes a slot on a side wall thereof. The slot is operably coupled with the first fastener to prevent the respective coupler from sliding along the corresponding bar and to guide rotation of the corresponding leg about the axis defined by the corresponding bar.

In some exemplary embodiments, the foldable supporting frame further includes a plurality of sliders and a plurality of oblique supports. Each slider is movably disposed at one of a corresponding bar in the plurality of bars and a corresponding leg in the plurality of legs. Each oblique support has a first end portion pivotally connected with a corresponding slider in the plurality of sliders and a second end portion pivotally connected with the other of the corresponding bar in the plurality of bars and the corresponding leg in the plurality of legs.

In various exemplary embodiments, the present disclosure provides a foldable supporting frame including an upper frame and a plurality of legs to support the upper frame when unfolded. The upper frame includes a plurality of bars, with adjacent bars in the plurality of bars coupled to each other or integrally formed with each other at their adjacent end portions. The plurality of bars includes first, second, third and fourth bars disposed at first, second, third and fourth sides of the upper frame, respectively. The plurality of legs includes first, second, third and fourth legs. The first leg has an upper end rotatably coupled with the first bar such that the first leg is rotatable toward or away from the third bar. The second leg rotatably has an upper end rotatably coupled with the second bar such that the second leg is rotatable toward or away from the fourth bar. The third leg has an upper end rotatably coupled with the third bar such that the third leg is rotatable toward or away from the first bar. The fourth leg has an upper end rotatably coupled with the fourth bar such that the first leg is rotatable toward or away from the second bar. When folded, the first, second, third and fourth legs are disposed in an interior defined by the upper frame.

In various exemplary embodiments, the present disclosure provides a foldable supporting frame including an upper frame and first, second, third, and fourth legs disposed below the upper frame when unfolded to support the upper frame. The upper frame includes first, second, third and fourth bars disposed at first, second, third and fourth sides of the upper frame, respectively. Adjacent bars in the first, second, third and fourth bars are coupled to each other or integrally formed with each other at their adjacent end portions. The upper frame has a substantially square shape. The first leg has an upper end rotatably coupled with the first bar. The second leg has an upper end rotatably coupled with the second bar. The third leg has an upper end rotatably coupled with the third bar. The fourth leg has an upper end rotatably coupled with the fourth bar. Each leg in the first, second, third and fourth legs is rotatable independently from other legs in the first, second, third and fourth legs. When folded, the first, second, third and fourth legs collectively form a substantially square shape within the square shape of the upper frame.

The supporting frames and tables of the present disclosure have other features and advantages that will be apparent from, or are set forth in more detail in, the accompanying drawings, which are incorporated herein, and the following Detailed Description, which together serve to explain certain principles of exemplary embodiments of the present disclosure.

BRIEF DESCRIPTION OF THE DRAWINGS

The accompanying drawings, which are incorporated into and constitute a part of this specification, illustrate one or more exemplary embodiments of the present disclosure and, together with the Detailed Description, serve to explain the principles and implementations of exemplary embodiments of the invention.

Figure 1:
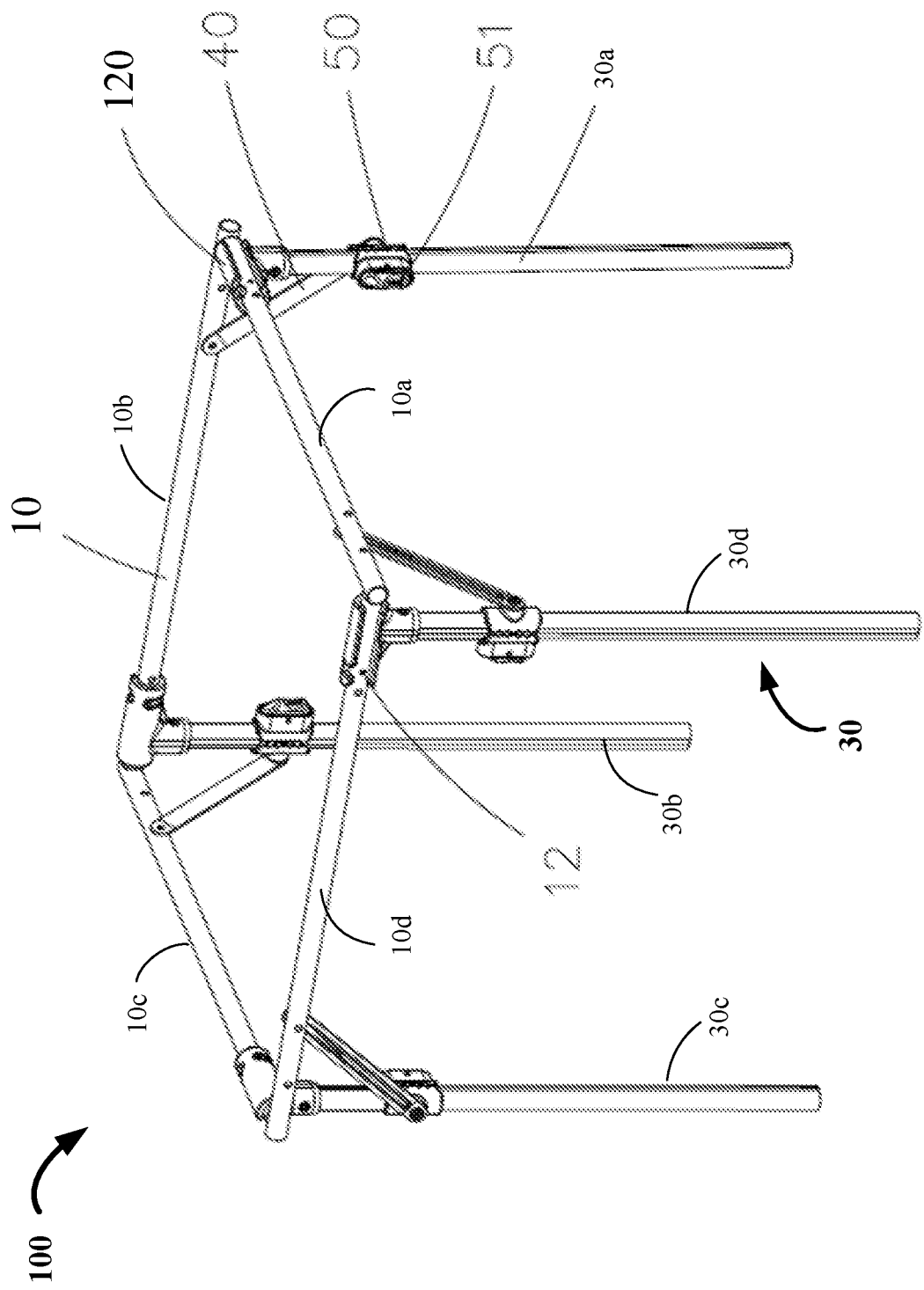
FIG. 1 is a perspective view illustrating an exemplary foldable supporting frame in an unfolded state in accordance with exemplary embodiments of the present disclosure.

As will be apparent to those of skill in the art, the components illustrated in the figures described above are combinable in any useful number and combination. The figures are intended to be illustrative in nature and are not limiting.

DETAILED DESCRIPTION

Reference will now be made in detail to implementation of exemplary embodiments of the present disclosure as illustrated in the accompanying drawings. The same reference indicators will be used throughout the drawings and the following detailed description to refer to the same or like parts. Those of ordinary skill in the art will understand that the following detailed description is illustrative only and is not intended to be in any way limiting. Other embodiments of the present disclosure will readily suggest themselves to such skilled persons having benefit of this disclosure.

In the interest of clarity, not all of the routine features of the implementations described herein are shown and described. It will be appreciated that, in the development of any such actual implementation, numerous implementation-specific decisions are made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of the exemplary embodiments set forth in this disclosure can be made without departing from the spirit and scope of the exemplary embodiments, as will be apparent to those skilled in the art. The specific exemplary embodiments described herein are offered by way of example only, and the disclosure is to be limited only by the terms of the appended claims, along with the full scope of equivalents to which such claims are entitled.

Embodiments of the present disclosure are described in the context of foldable supporting frames. A foldable supporting frame generally includes an upper frame and a plurality of legs disposed below the upper frame when unfolded to support the upper frame. Each leg is coupled with the upper frame and independently rotatable, i.e., rotation of a leg would not affect the other legs. In some exemplary embodiments, the upper frame includes a plurality of bars connected or integrally formed with each other at their adjacent end portions, and each leg is coupled with a corresponding bar in the plurality of bars and independently rotatable about an axis defined by the corresponding bar.

The supporting frames of the present disclosure are simple, easy to fold and unfold, and compact when folded. They can be made of various materials including but not limited to metals (e.g., iron, steel, and aluminum) and plastics. In some exemplary embodiments, the bars and legs are made of metals or the like while some other components (e.g., couplers, sliders) are made of plastics, rubbers or the like.

The supporting frames of the present disclosure can be used to support various structures including but not limited to table panels, desk panels and bench panels. For instance, a supporting frame of the present disclosure can be coupled with a table panel to make a foldable table. The panels can be of various shapes including but not limited to a square shape, a round shape or a rectangular shape. The panels can be made of various materials including but not limited to metals, plastics and woods. In some exemplary embodiments, the panels are made of plastics by injection molding, blow molding or any other suitable processes.

Figure 2:
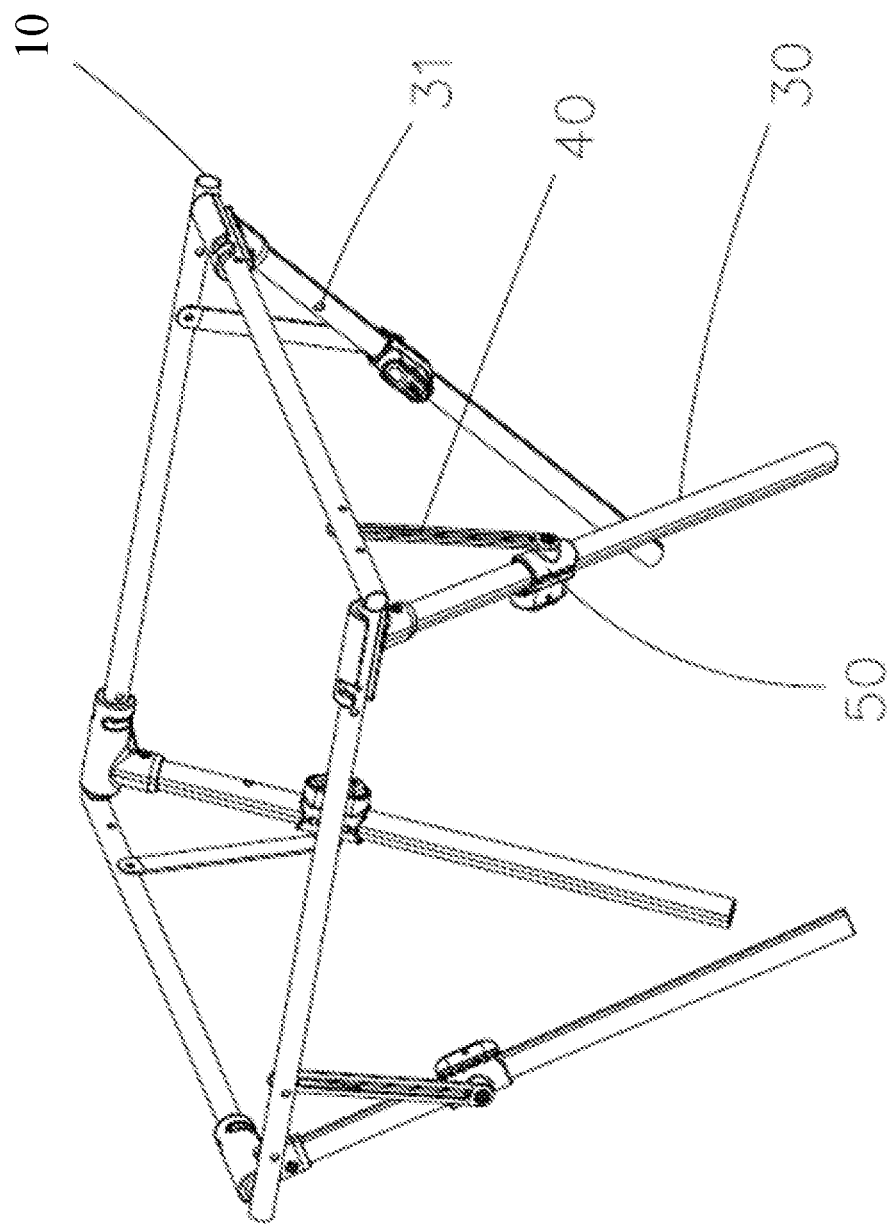
FIG. 2 is a perspective view illustrating the foldable supporting frame of FIG. 1 in an intermediate state in accordance with exemplary embodiments of the present disclosure.
Figure 3:
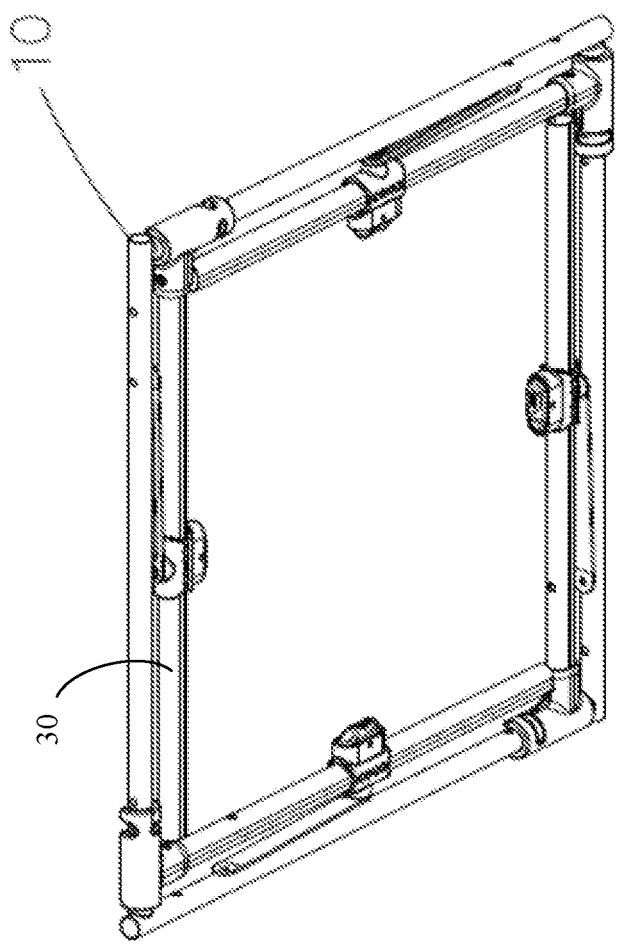
FIG. 3 is a perspective view illustrating the foldable supporting frame of FIG. 1 in a folded state in accordance with exemplary embodiments of the present disclosure.

Referring now to FIGS. 1-3, there is depicted exemplary foldable supporting frame 100 in accordance with some exemplary embodiments of the present disclosure. As shown, foldable supporting frame 100 includes upper frame 10 and a plurality of legs 30 disposed below the upper frame when unfolded to support the upper frame.

Upper frame 10 includes a plurality of bars, with the adjacent bars coupled to each other or integrally formed with each other at their adjacent end portions. The number of bars can be three, four, five, six, or more than six bars. By way of example, FIGS. 1-3 illustrate upper frame 10 including four bars, e.g., first bar 10a, second bar 10b, third bar 10c and fourth bar 10d. The first, second, third and fourth bars are disposed at the first, second, third and fourth sides of the upper frames, respectively, and are coupled to or integrally formed with their adjacent bars. For instance, in an exemplary embodiment, the adjacent end portions of adjacent bars (e.g., the first and second bars, the second and third bars, etc.) are welded together. In another exemplary embodiment, the upper frame is made of one or more bended bars. For instance, the first and second bars are made of a single bended bar.

The length of each bar can be the same or different from the lengths of other bars. In some exemplary embodiments, each bar in the plurality of bars has the same length, resulting in an equilateral the upper frame. For instance, in the illustrated embodiment, there are four bars, each having a length substantially the same as others. As a result, the upper frame has a square shape. In another exemplary embodiment, the lengths of the first and third bars are different than the lengths of the second and fourth bars. Accordingly, the upper frame has a rectangular shape.

Each of the plurality of legs is coupled with a corresponding bar in the plurality of bars and is independently rotatable (e.g., rotation of one leg does not affect any other legs) about an axis defined by the corresponding bar in the plurality of bars. For instance, in some exemplary embodiments, the plurality of legs includes four legs such as first leg 30a, second leg 30b, third leg 30c and fourth leg 30d. First leg 30a has an upper end coupled with first bar 10a and is independently rotatable about a first axis defined by first bar 10a. Similarly, second leg 30b has an upper end coupled with second bar 10b and is independently rotatable about a second axis defined by second bar 10b. Third leg 30c has an upper end coupled with third bar 10c and is independently rotatable about a third axis defined by third bar 10c. Fourth leg 30d has an upper end coupled with fourth bar 10d and is independently rotatable about a fourth axis defined by fourth bar 10d.

In an exemplary embodiment, the first axis coincides substantially with the length direction of the first bar, the second axis coincides substantially with the length direction of the second bar, the third axis coincides substantially with the length direction of the third bar, and the fourth axis coincides substantially with the length direction of the fourth bar. In another exemplary embodiment, the first axis is substantially perpendicular to the length direction of the first bar, the second axis substantially perpendicular to the length direction of the second bar, the third axis substantially perpendicular to the length direction of the third bar, and the fourth axis substantially perpendicular to the length direction of the fourth bar.

In some exemplary embodiments, a leg is rotatably coupled with a bar such that it is independently rotatably toward or away from an adjacent or opposite bar. For instance, in an exemplary embodiment, the first leg has an upper end rotatably coupled with the first bar such that the first leg is rotatable toward or away from the third bar. The second leg has an upper end rotatably coupled with the second bar such that the second leg is rotatable toward or away from the fourth bar. The third leg has an upper end rotatably coupled with the third bar such that the third leg is rotatable toward or away from the first bar. The fourth leg has an upper end rotatably coupled with the fourth bar such that the first leg is rotatable toward or away from the second bar.

Figure 4:
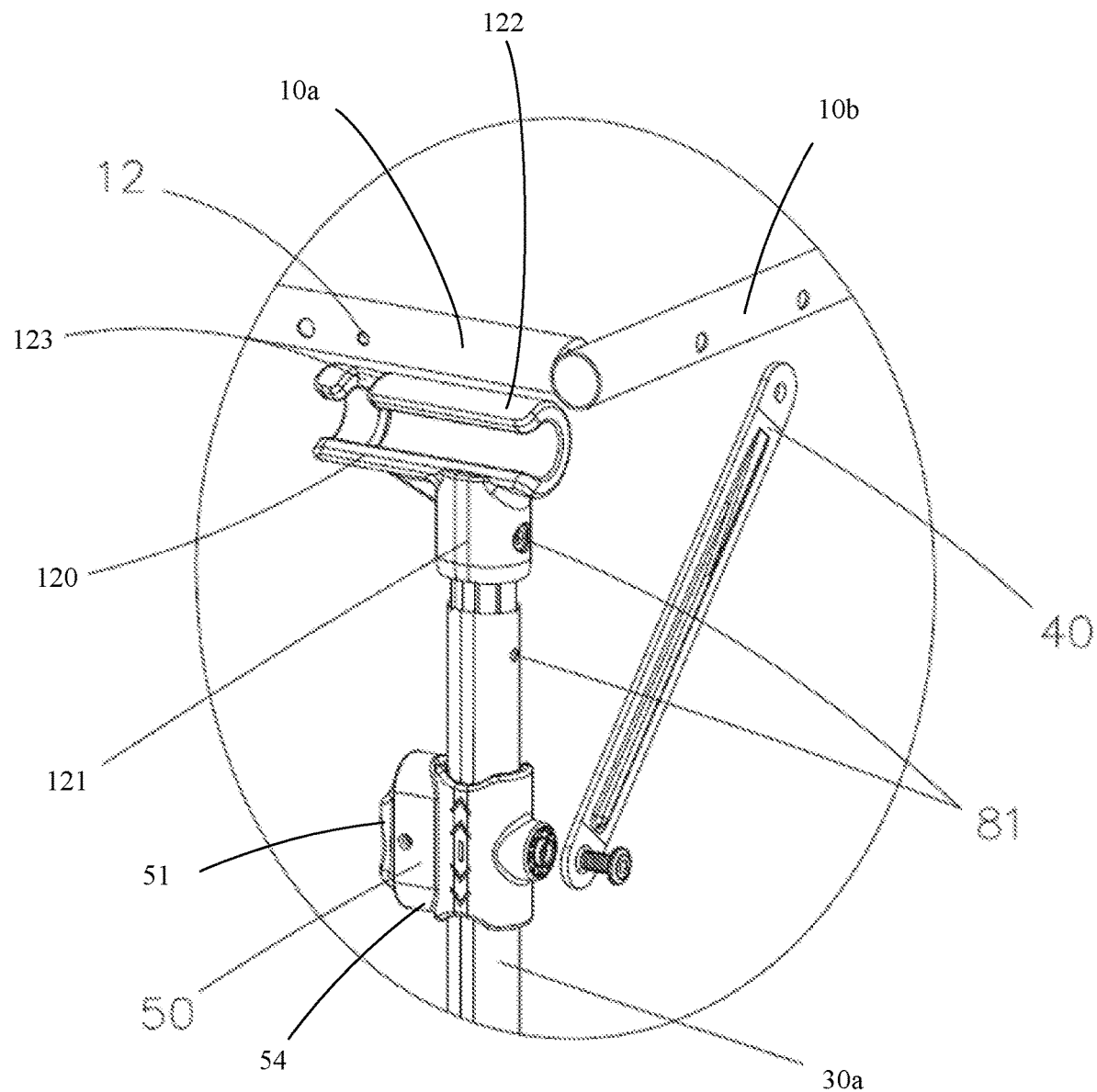
FIG. 4 is an enlarged and partially dissembled view illustrating some components of the foldable supporting frame of FIG. 1 in accordance with exemplary embodiments of the present disclosure.

In some exemplary embodiments, the plurality of legs is coupled with the upper frame by a plurality of couplers such as coupler 120. Coupler 120 generally includes a rotating portion rotatably coupled with a corresponding bar in the plurality of bars and a fixation portion fixedly coupled or integrally formed with the upper end portion of a corresponding leg in the plurality of legs. For instance, by way of example, FIG. 4 illustrates coupler 120 including rotating portion 122 configured to be rotatably coupled with first bar 10a and fixation portion 121 configured to be fixedly coupled with the upper end portion of first leg 30a.

In some exemplary embodiments, fixation portion 121 of the coupler is inserted into the upper end portion of the leg (e.g., first leg 30a), or the upper end portion of the leg is inserted into the fixation portion of the coupler. In an exemplary embodiment, the fixation portion of the coupler is configured to be relatively bigger than the upper end portion of the leg and has an opening to receive the upper end portion of the leg. Then, the fixation portion of the coupler and the upper end portion of the leg are fixedly coupled with each other by a fastener through holes 81 formed at the first portion of the coupler and the upper end portion of the leg.

In some exemplary embodiments, rotating portion 122 of the coupler is configured to include a general split ring (e.g., a tube or a ring with a slit) that sleeves on the bar (e.g., the first bar). To aid the rotation, at least a portion (e.g., the portion where the rotating portion 122 is placed) of the bar is circular, e.g., having a circular outer circumference. In an exemplary embodiment, the bar is circular along substantially the entire length of the bar.

In some exemplary embodiments, rotating portion 122 of coupler 120 is formed with a slot such as slot 123 on a side wall of the rotating portion for operably coupling with a guiding post at the bar (e.g., first bar 10a). The guiding post can be a bolt, a screw, a pin, a bump, a protrusion or the like that is disposed or formed at the bar, e.g., at position 12 of first bar 10a. The slot and guiding post collectively prevent coupler 120 from sliding along the length of the bar (e.g., first bar 10a) and to guide rotation of the leg (e.g., first leg 30a) about the axis defined by the bar (e.g., first axis defined by first bar 10a).

The foldable supporting frame can include additional, optional or alternative features. For instance, in some exemplary embodiments, foldable supporting frame 100 includes a plurality of sliders such as slider 50 and a plurality of oblique supports such as oblique support 40. Slider 50 is movably disposed at a bar or a leg. For instance, in some exemplary embodiments such as those illustrated in FIGS. 1-4, the slider is movably disposed at a leg (e.g., first leg 30a). In such embodiments, oblique support 40 has a first end portion pivotally connected with a slider and a second end portion pivotally connected with a corresponding bar. For instance, oblique support 40 in FIG. 4 has a first end portion pivotally connected with slider 50 disposed at first leg 30a and a second end portion pivotally connected with second bar 10b. In embodiments where each slider 50 is movably disposed at a bar in the plurality of bars, each oblique support 40 has a first end portion pivotally connected with a slider in the plurality of sliders and a second end portion pivotally connected with a corresponding leg in the plurality of legs.

Figure 5:
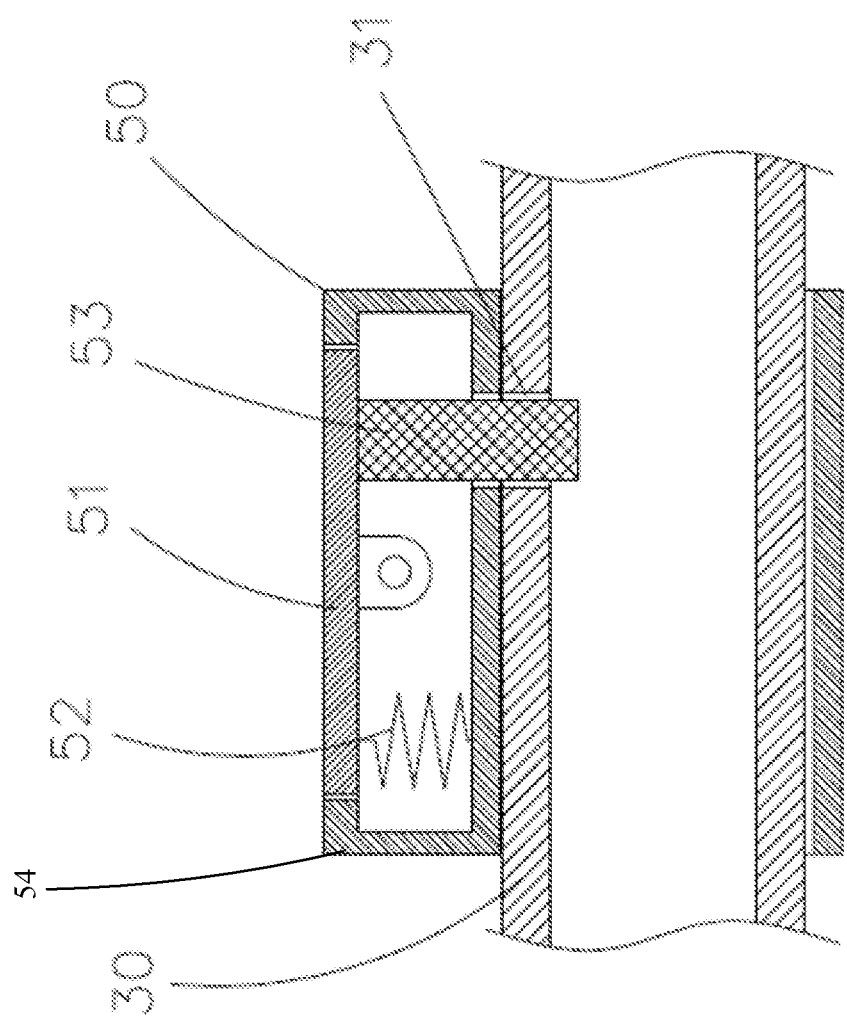
FIG. 5 is a schematic cutout view illustrating some components of the foldable supporting frame of FIG. 1 in accordance with exemplary embodiments of the present disclosure.
Figure 6:
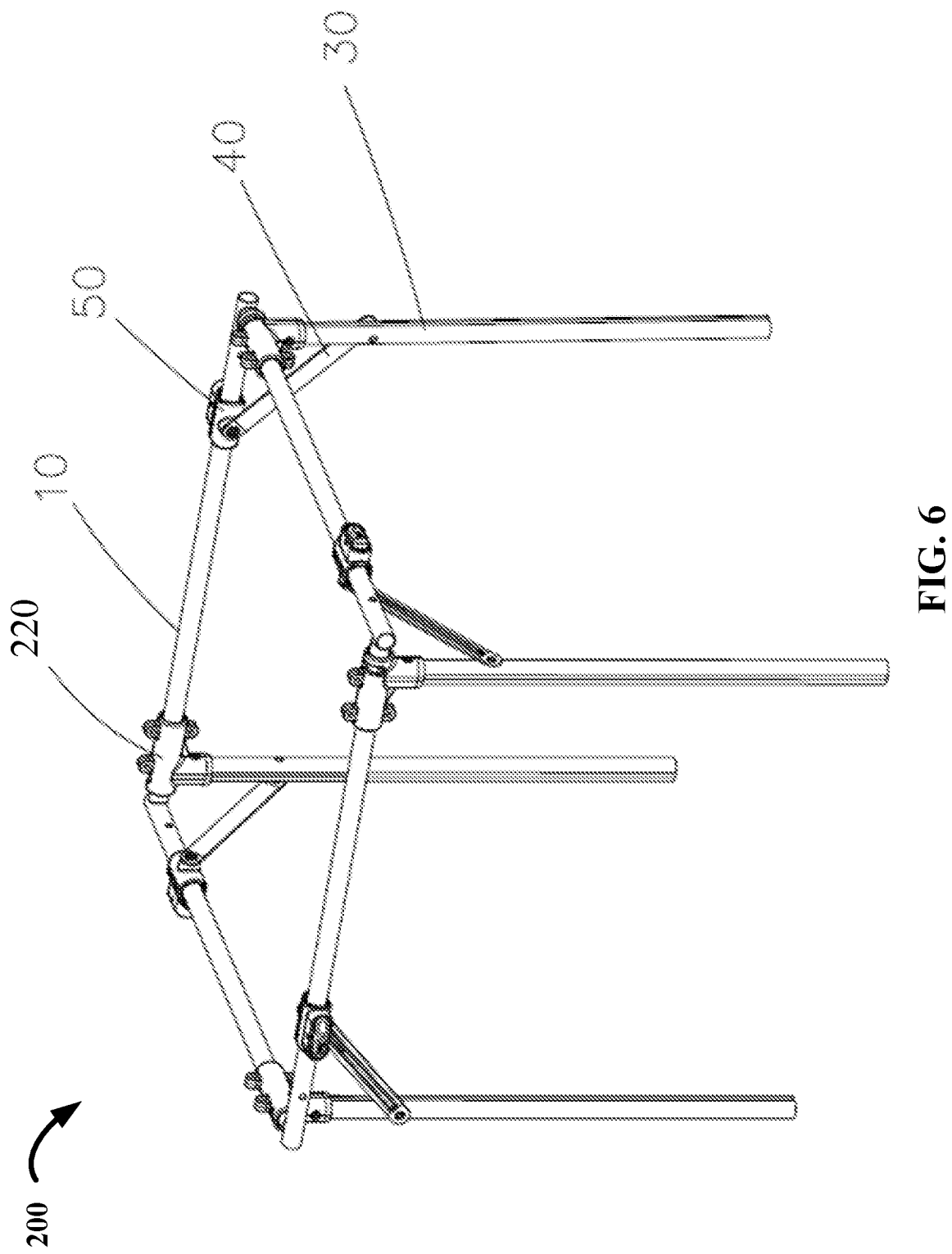
FIG. 6 is a perspective view illustrating an exemplary foldable supporting frame in an unfolded state in accordance with exemplary embodiments of the present disclosure.
Figure 7:
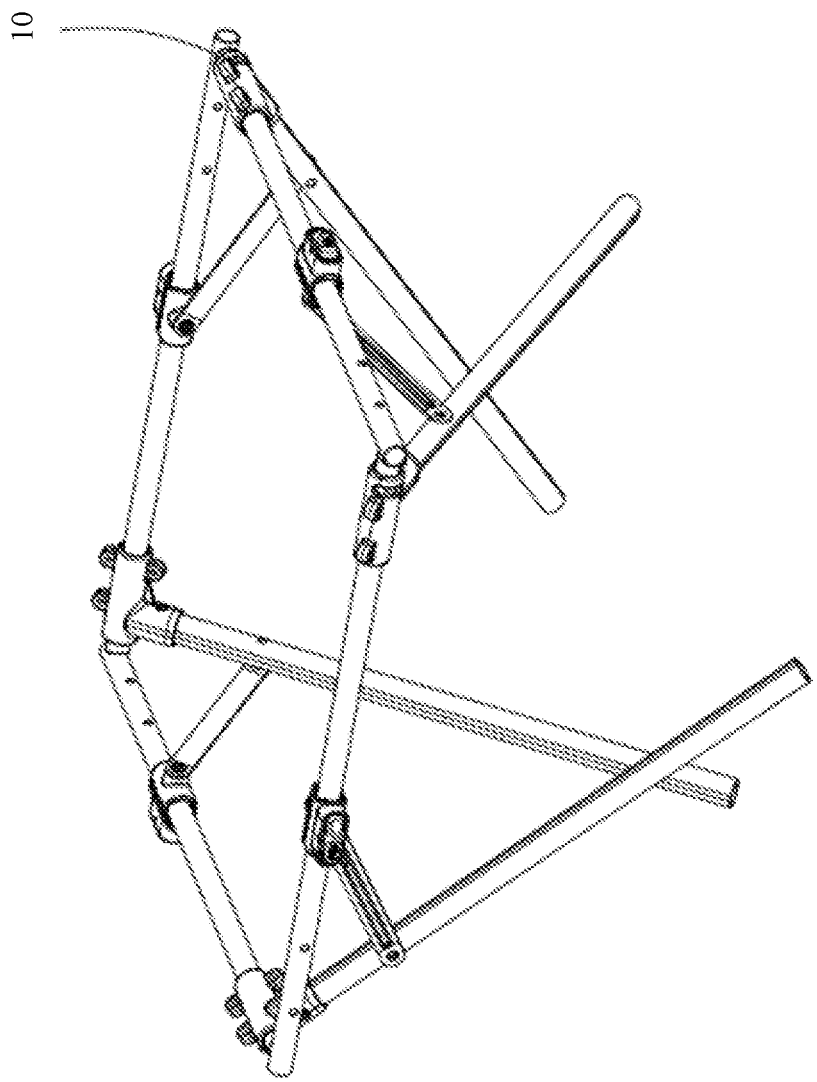
FIG. 7 is a perspective view illustrating the foldable supporting frame of FIG. 6 in an intermediate state in accordance with exemplary embodiments of the present disclosure.
Figure 8:
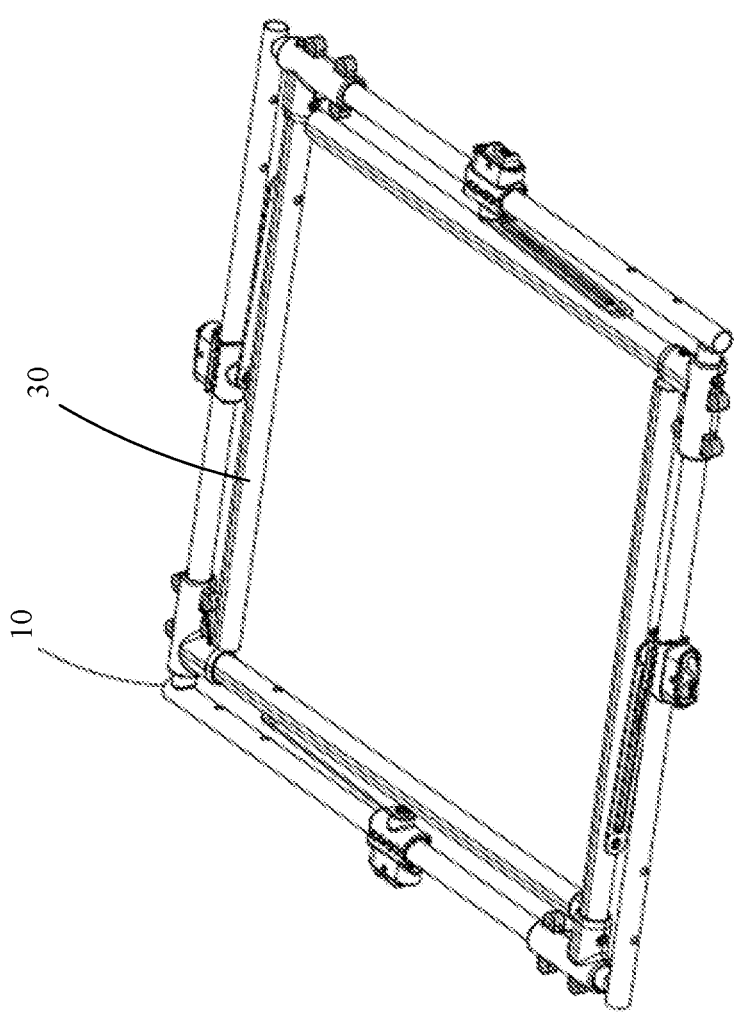
FIG. 8 is a perspective view illustrating the foldable supporting frame of FIG. 6 in a folded state in accordance with exemplary embodiments of the present disclosure.

Examples of sliders are disclosed in U.S. patent application Ser. Nos. 16/838,944 and 16/838,947, the disclosure of each application is incorporated herein for all purposes by reference in its entirety. In some exemplary embodiments, slider 50 includes a body, a button, a pin and an elastic member such as body 54, button 51, pin 53 and elastic member 52 illustrated in FIGS. 4 and 5. Body 54 is configured to slidably couple with a bar or a leg. The middle portion of button 51 is pivotally coupled with the body. Pin 53 is disposed at a first end portion of the button, and elastic member 52 is operably coupled with a second end portion of the button. As such, under normal conditions, the elastic member pushes the pin into a hole such as hole 31 formed at the bar or leg, thereby restricting movement of the slider along the bar or the leg. Generally, hole 31 is located at a position at which the leg is unfolded. As such, when the pin is pushed into hole 31, the slider is restricted from moving along the bar or leg and thus the leg is restricted from rotating with respect to the upper frame. This helps stabilize the supporting frame and prevent accidental folding of the supporting frame. When folding is desired, one can push the button to release the pin from hole 31. Once the pin is disengaged from hole 31, the leg is free to rotate or fold.

When folded, the plurality of legs are disposed in an interior defined by the upper frame as illustrated in FIG. 3. In some exemplary embodiments, when folded, the plurality of legs is disposed in the plane as the upper frame. In an exemplary embodiment, when folded, the first, second, third and fourth legs collectively form a substantially square shape within the square shape of the upper frame. While FIG. 3 illustrates the first, second, third and fourth legs when folded forming a closed or an almost closed loop, it should be noted that this is a non-limiting example. The legs (such as the first, second, third and fourth legs) when folded can form a closed loop or an open loop (e.g., with a gap between two adjacent leg) or not form a loop at all.

Referring now to FIGS. 6-9, there is depicted exemplary foldable supporting frame 200 in accordance with some exemplary embodiments of the present disclosure. Like foldable supporting frame 100, foldable supporting frame 200 includes upper frame 10 and a plurality of legs 30 disposed below the upper frame when unfolded to support the upper frame. Upper frame 10 includes a plurality of bars, with the adjacent bars coupled to each other or integrally formed with each other at their adjacent end portions. Each of the plurality of legs is coupled with a corresponding bar in the plurality of bars and is independently rotatable about an axis defined by the corresponding bar in the plurality of bars.

In some exemplary embodiments, the plurality of legs is coupled with the upper frame by a plurality of couplers such as coupler 220. Coupler 220 includes first coupling piece 220a and second coupling piece 220b, each having a first portion such as first portion 221 and a second portion such as second portion 222. While the first and second coupling pieces in the illustrated embodiment are substantially the same, it should be noted that this is a non-limiting example. The first and second coupling pieces can be different from each other.

First coupling piece 220a and second coupling piece 220b are coupled with each other, for instance, through one or more lugs such as lug 224 formed at the first and second coupling pieces and hole 225 formed at each lug. The first portions of the first and second pieces collectively form a fixation portion fixedly coupled with the upper end portion of a leg (e.g., first leg 30*a*). The second portions of the first and second coupling pieces collectively form a rotating portion rotatably coupled with a bar (e.g., first bar 10*a*). In some exemplary embodiments, second portion 222 of each of the first and second coupling pieces has a shape similar to a semi-cylindrical shell. The second portions of the first and second coupling pieces, e.g., the pair of semi-cylindrical shells, form a tube-like rotating portion that sleeves on the bar.

In an exemplary embodiments, second portion 222 of the first or second coupling piece is formed with a slot such as slot 223 for operably coupling with a guiding post at the bar (e.g., at position 12 of first bar 10*a*). In another exemplary embodiment, second portion 222 of each of the first and second coupling pieces is formed with a slot, and the slots of both coupling pieces operably work together with the guiding post at the bar. The slot(s) and guiding post collectively prevent coupler 220 from sliding along the length of the bar (e.g., first bar 10*a*) and to guide rotation of the leg (e.g., first leg 30*a*) about the axis defined by the bar (e.g., first axis defined by first bar 10*a*).

In an exemplary embodiment, ribs such as rib 226 are formed on an interior circumferential surface of second portion 222 of the first or second coupling piece. In an exemplary embodiment, ribs such as rib 226 are formed on the interior circumferential surfaces of the second portions of both first and second coupling pieces. The ribs enhance the feeling of the rotation of a leg (first leg 30*a*).

Figure 9:
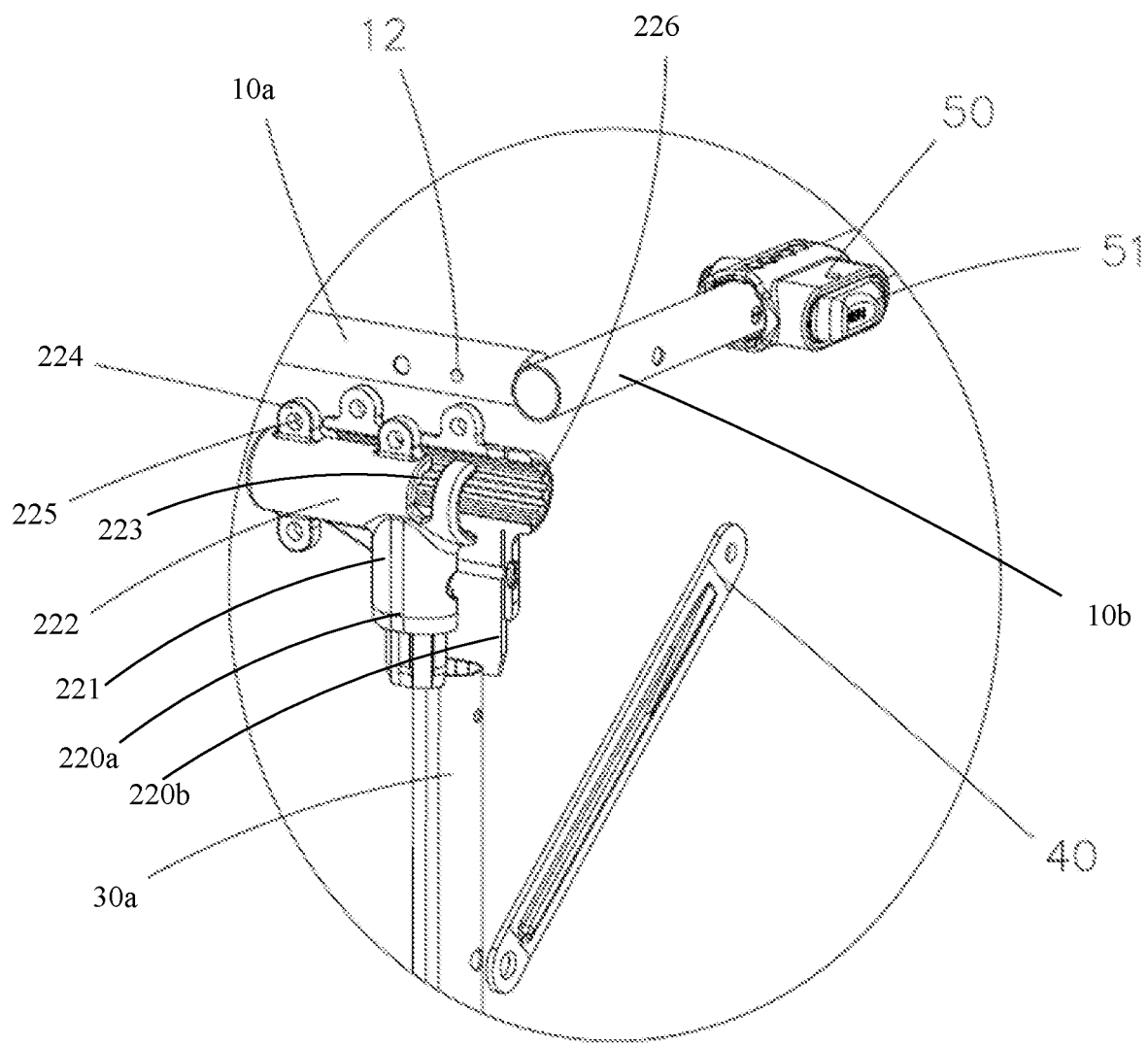
FIG. 9 is an enlarged and partially dissembled view illustrating some components of the foldable supporting frame of FIG. 6 in accordance with exemplary embodiments of the present disclosure.
Figure 10:
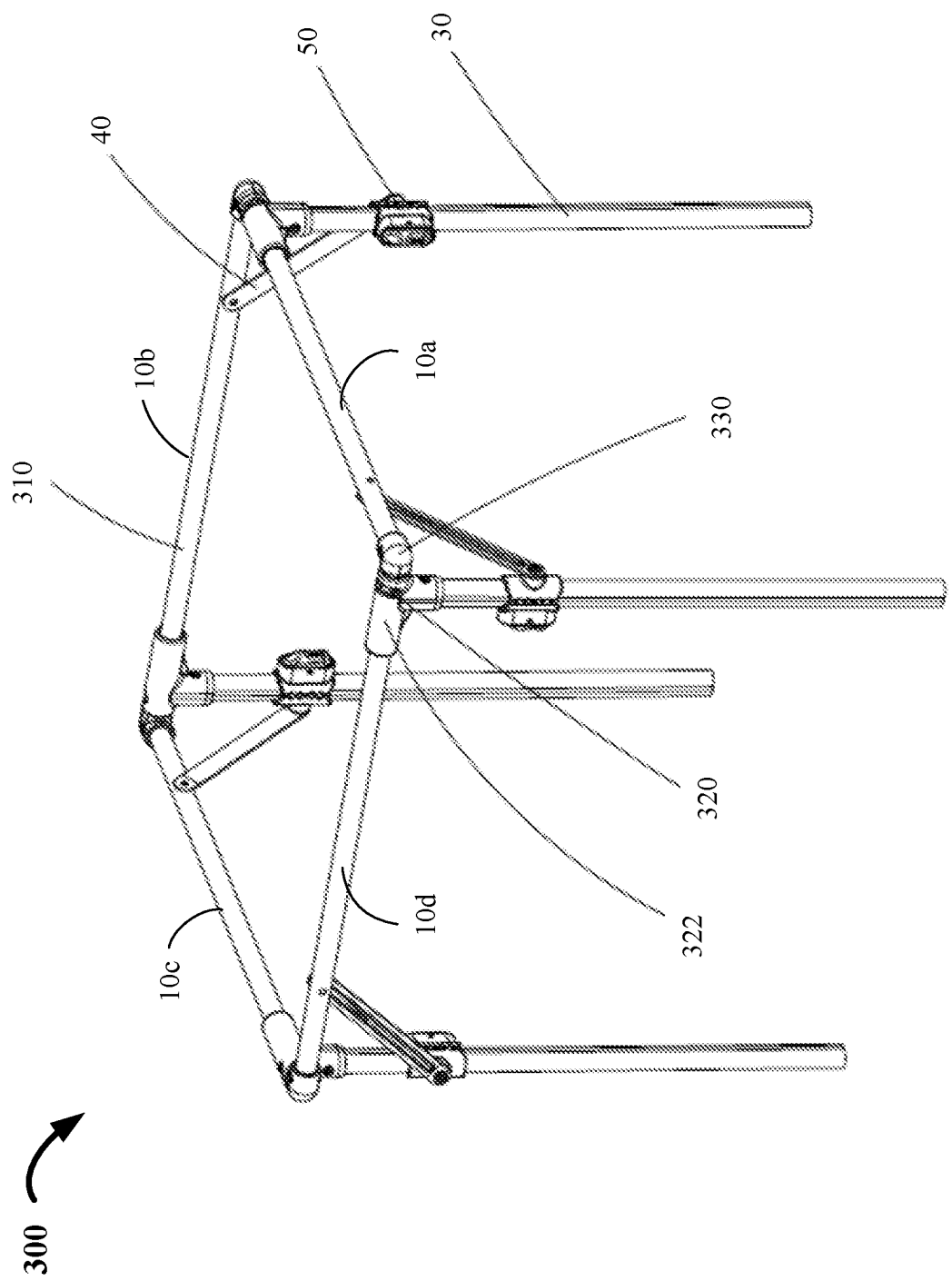
FIG. 10 is a perspective view illustrating an exemplary foldable supporting frame in an unfolded state in accordance with exemplary embodiments of the present disclosure.
Figure 11:
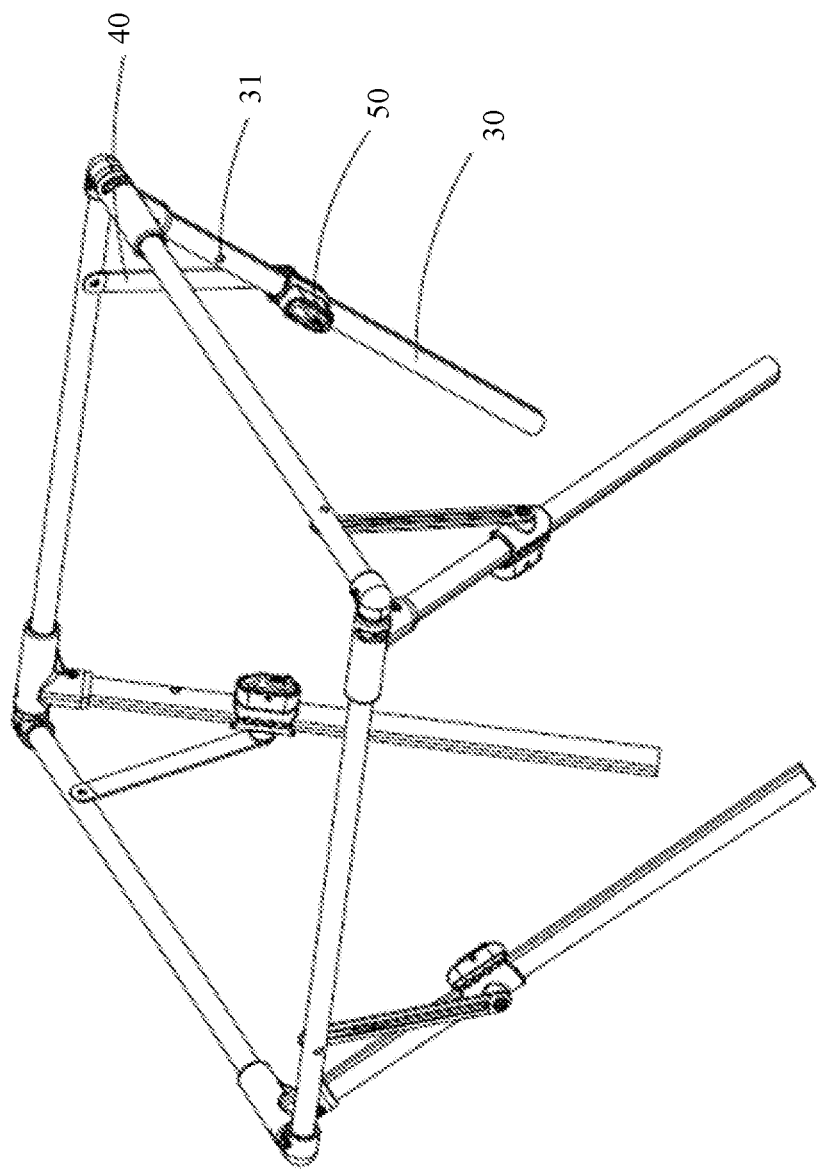
FIG. 11 is a perspective view illustrating the foldable supporting frame of FIG. 10 in an intermediate state in accordance with exemplary embodiments of the present disclosure.
Figure 12:
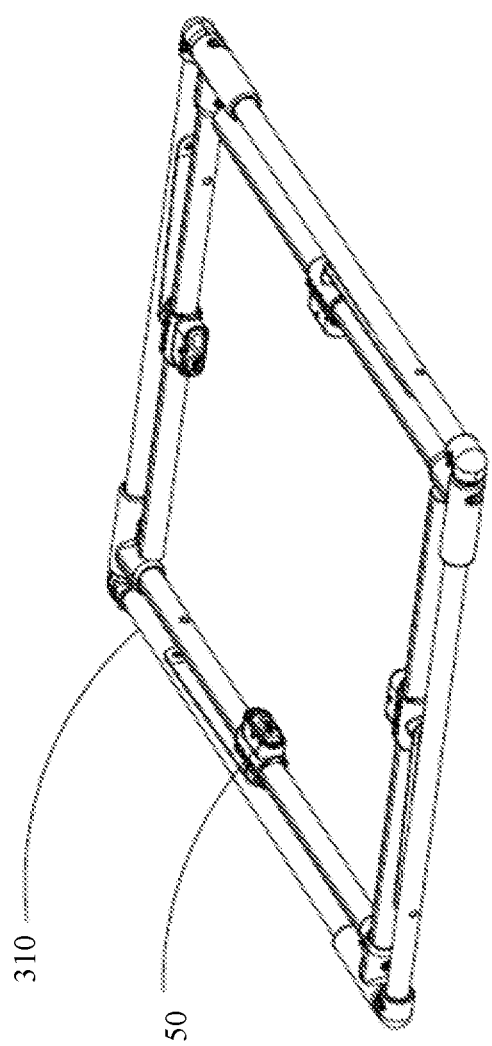
FIG. 12 is a perspective view illustrating the foldable supporting frame of FIG. 10 in a folded state in accordance with exemplary embodiments of the present disclosure.
Figure 13:
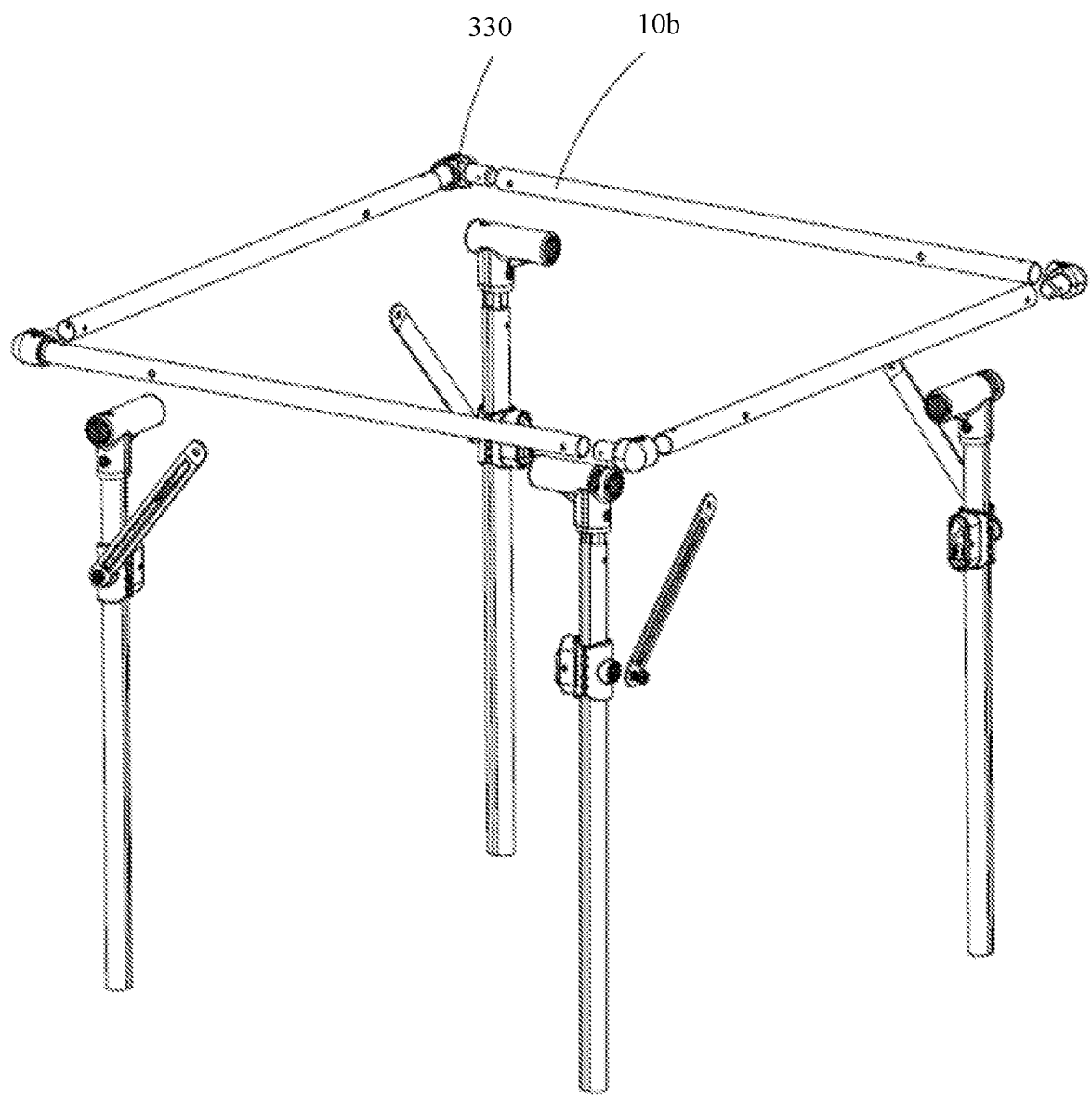
FIG. 13 is a partially dissembled view illustrating the foldable supporting frame of FIG. 10 in accordance with exemplary embodiments of the present disclosure.

Like foldable supporting frame 100, in some exemplary embodiments, foldable supporting frame 200 includes additional, optional or alternative features such as a plurality of sliders 50 and a plurality of oblique supports 40. In an exemplary embodiment, slider 50 is movably disposed at a bar; and oblique support 40 has a first end portion pivotally connected with a slider and a second end portion pivotally connected with a corresponding leg. For instance, FIG. 9 illustrates slider 50 slidably disposed at second bar 10*b*, and oblique support 40 having a first end portion pivotally connected with slider 50 disposed at second bar 10*b* and a second end portion pivotally connected with first leg 30*a*.

Referring now to FIGS. 10-14, there is depicted exemplary foldable supporting frame 300 in accordance with some exemplary embodiments of the present disclosure. Foldable supporting frame 300 includes an upper frame such as upper frame 310 and a plurality of legs 30 disposed below the upper frame when unfolded to support the upper frame. Like upper frame 10, upper frame 310 includes a plurality of bars such as first bar 10*a*, second bar 10*b*, third bar 10*c* and fourth bar 10*d*, with the adjacent bars coupled to each other or integrally formed with each other at their adjacent end portions.

In some exemplary embodiments, the adjacent bars of upper frame 310 is coupled with each other at their adjacent end portions by a corner joint such as corner joint 330. For instance, in some exemplary embodiments, corner joint 330 includes a first end portion such as first end portion 331 and a second end portion such as second end portion 333. The first and second end portions of the corner joint are disposed at an angle relative to each other. Depending on the configuration of the upper frame (e.g., the number of the bars, the lengths of the bars, the arrangement of the bars), the angle can be any suitable degrees, for instance, between 60 degrees and 180 degrees. In an exemplary embodiment, the angle of a corner joint is about 90 degrees, i.e., the first and second end portions of the corner joint is substantially perpendicular to each other.

Figure 14:
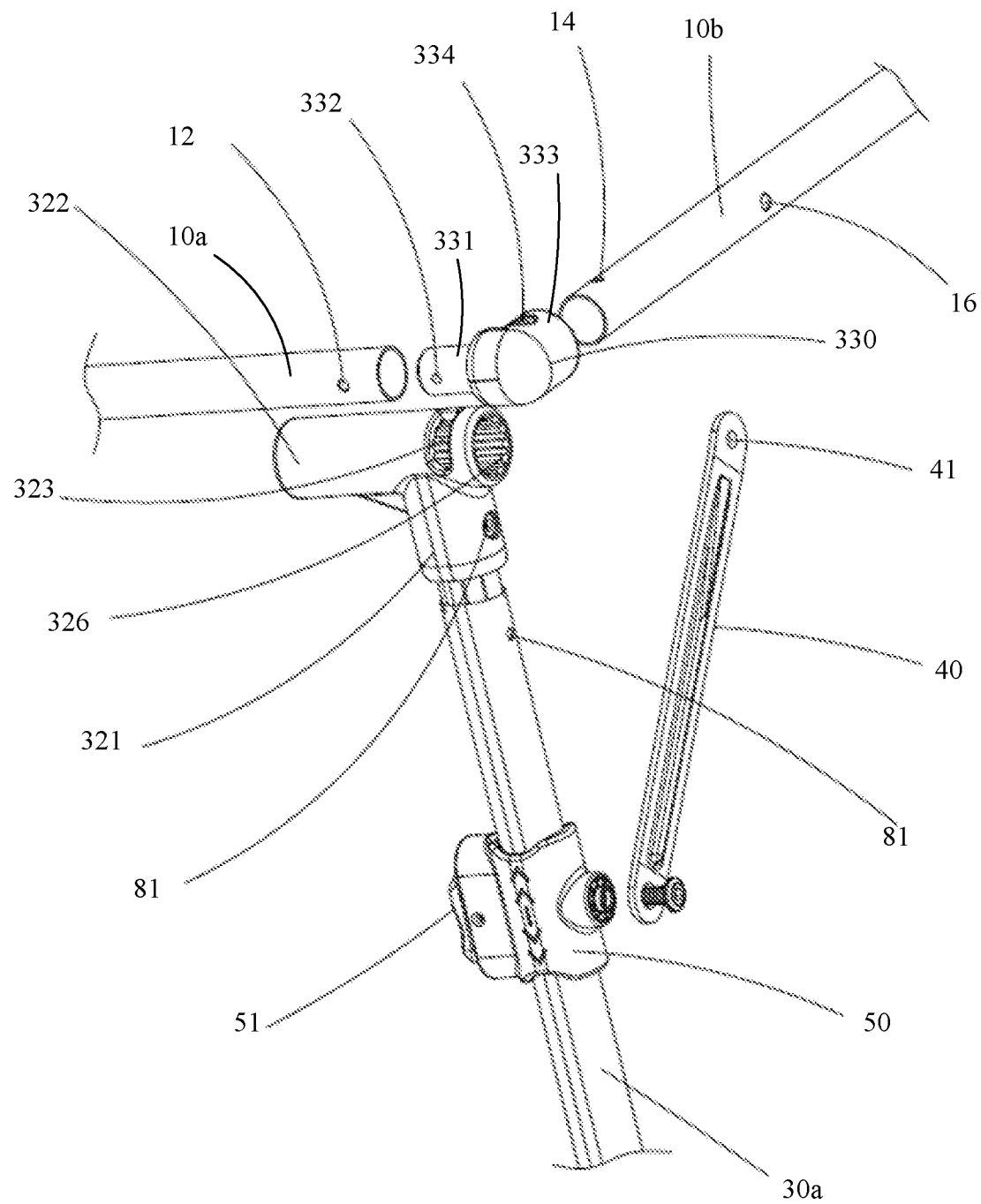
FIG. 14 is an enlarged and partially dissembled view illustrating some components of the foldable supporting frame of FIG. 10 in accordance with exemplary embodiments of the present disclosure.

In an exemplary embodiment, the first end portion of a corner joint is inserted into one of the adjacent end portions of adjacent bars and a second end portion of the corner joint is sleeved on the other of the adjacent end portions of adjacent bars. In another exemplary embodiment, each of the first and second end portions of the corner joint is inserted into an end portion of an adjacent bar. In still another exemplary embodiment, each of the first and second end portions of the corner joint is sleeve on an end portion of an adjacent bar. By way of example, FIG. 14 illustrates first end portion 331 of corner joint 330 is inserted into the end portion of first bar 10*a* and second end portion 333 of corner joint 330 is sleeved on the end portion of second bar 10*b*. In an exemplary embodiment, the first end portion of corner joint 330 and the end portion of first bar 10*a* are fastened with each other, for instance, by a fastener (e.g., screw, bolt, pin or the like) through hole 332 formed at the first end portion of corner joint 330 and hole 12 formed at the end portion of first bar 10*a*. Similarly, in an exemplary embodiment, the second end portion of corner joint 330 and the end portion of second bar 10*b* are fastened with each other, for instance, by a fastener through hole 334 formed at the second end portion of corner joint 330 and hole 14 formed at the end portion of second bar 10*b*.

Like foldable supporting frame 100, each of the plurality of legs of foldable supporting frame 300 is coupled with a corresponding bar in the plurality of bars and is independently rotatable about an axis defined by the corresponding bar in the plurality of bars. In some exemplary embodiments, foldable supporting frame 300 includes a plurality of couplers such as coupler 320 to couple the plurality of legs with the plurality of bars. Like coupler 120, coupler 320 generally includes a rotating portion rotatably coupled with a corresponding bar in the plurality of bars and a fixation portion fixedly coupled or integrally formed with the upper end portion of a corresponding leg in the plurality of legs. For instance, by way of example, FIG. 14 illustrates coupler 320 including rotating portion 322 configured to be rotatably coupled with first bar 10*a* and fixation portion 321 configured to be fixedly coupled with the upper end portion of first leg 30*a*. Fixation portion 321 can be substantially the same as fixation portion 121, the description thereof is omitted herein to avoid redundancy.

In some exemplary embodiments, rotating portion 322 of the coupler has a general tubular shape and is sleeved on the bar (e.g., the first bar). In some exemplary embodiments, rotating portion 322 of coupler 320 is sleeved on first bar 10*a* at a position where the first end portion of corner joint 330 and the end portion of first bar 10*a* are fixedly coupled with each other. In an exemplary embodiment, rotating portion 322 of coupler 320 is formed with a slot such as slot 323 on a side wall of the rotating portion for operably coupling with the fastener that goes through hole 332 formed at the first end portion of corner joint 330 and hole 12 formed at the end portion of first bar 10*a*. The fastener severs as a guiding post. The slot and guiding post collectively prevent coupler 320 from sliding along the length of the bar (e.g., first bar 10*a*) and to guide rotation of the leg (e.g., first leg 30*a*) about the axis defined by the bar (e.g., first axis defined by first bar 10*a*).

In an exemplary embodiment, ribs such as rib 326 are formed on an interior circumferential surface of the rotating portion of coupler 320 to assist in rotation of a leg, e.g., rotation of first leg 30*a* along the first axis defined by first bar 10*a*.

Like foldable supporting frame 100, in some exemplary embodiments, foldable supporting frame 200 includes additional, optional or alternative features such as a plurality of sliders 50 and a plurality of oblique supports 40. In an exemplary embodiment, slider 50 is movably disposed at a leg in the plurality of legs; and oblique support 40 has a first end portion pivotally connected with a slider in the plurality of sliders and a second end portion pivotally connected with a corresponding bar in the plurality of bars, for instance, through hole 41 formed at the oblique support and hole 16 formed at the bar.

The components disclosed herein are combinable in any useful number and combination. For instance, coupler 120 can replace coupler 220 of supporting frame 200 or coupler 320 of supporting frame 300. Likewise, coupler 220 can replace coupler 120 of supporting frame 100 and coupler 320 of supporting frame 300, and coupler 320 can replace coupler 120 of supporting frame 100 and coupler 220 of supporting frame 200.

The supporting assemblies disclosed herein are simple, easy to fold and unfold, and compact when folded. With sliders, folding and unfolding of the supporting assemblies are smooth and fast. In addition, the supporting frames disclosed herein be used to support various structures including but not limited to table panels.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that the terms "top" or "bottom", "lower" or "upper", and etc. are used to describe features of the exemplary embodiments with reference to the positions of such features as displayed in the figures. It will be understood that, although the terms "first," "second," etc. may be used herein to describe various elements, these elements should not be limited by these terms. These terms are only used to distinguish one element from another. For example, a first bar could be termed a second bar, and, similarly, a second bar could be termed a first bar, without changing the meaning of the description, so long as all occurrences of the "first bar" are renamed consistently and all occurrences of the "second bar" are renamed consistently.

What is claimed is:

1. A foldable supporting frame comprising:
an upper frame comprising a plurality of bars, wherein adjacent bars in the plurality of bars are coupled to each other or integrally formed with each other at adjacent end portions thereof;
a plurality of legs disposed below the upper frame when unfolded to support the upper frame, wherein each of the plurality of legs is coupled with a corresponding bar in the plurality of bars and independently rotatable about an axis defined by the corresponding bar in the plurality of bars, wherein when folded, the plurality of legs are disposed in an interior defined by the upper frame; and
a plurality of couplers to couple the plurality of legs with the upper frame, wherein each respective coupler in the plurality of couplers comprises a rotating portion rotatably coupled with a corresponding bar in the plurality of bars and a fixation portion fixedly coupled or integrally formed with the upper end portion of a corresponding leg in the plurality of legs;
wherein at least a portion of the corresponding bar is circular, and the rotating portion of the respective coupler sleeves on the circular portion of the corresponding bar;
wherein the rotating portion of the respective coupler comprises a slot on a side wall thereof, wherein the slot is operably coupled with a guiding post at the corresponding bar to prevent the respective coupler from sliding along a length of the corresponding bar and to guide rotation of the corresponding leg about the axis defined by the corresponding bar.

2. The foldable supporting frame of claim 1, wherein:
the plurality of bars comprises:
a first bar at a first side of the upper frame;
a second bar at a second side of the upper frame;
a third bar at a third side of the upper frame; and
a fourth bar at a fourth side of the upper frame;
the plurality of legs comprises:
a first leg having an upper end coupled with the first bar and independently rotatable about a first axis defined by the first bar;
a second leg having an upper end coupled with the second bar and independently rotatable about a second axis defined by the second bar;
a third leg having an upper end coupled with the third bar and independently rotatable about a third axis defined by the third bar; and
a fourth leg having an upper end coupled with the fourth bar and independently rotatable about a fourth axis defined by the fourth bar.

3. The foldable supporting frame of claim 2, wherein each of the first, second, third and fourth bars has a length substantially the same as others.

4. The foldable supporting frame of claim 3, wherein the upper frame has a substantially square shape.

5. The foldable supporting frame of claim 4, wherein when folded the first, second, third and fourth legs collectively form a substantially square shape within the square shape of the upper frame.

6. The foldable supporting frame of claim 1, wherein the fixation portion of the respective coupler is inserted into the upper end portion of the corresponding leg, or the upper end portion of the corresponding leg is inserted into the fixation portion of the respective coupler.

7. The foldable supporting frame of claim 1, wherein the adjacent end portions of adjacent bars in the plurality of bars are welded together, or connected by a plurality of corner joints.

8. The foldable supporting frame of claim 7, wherein each respective corner joint in the plurality of corner joins has a first end portion inserted into one of the adjacent end portions of adjacent bars in the plurality of bars and a second end portion sleeved on the other of the adjacent end portions of adjacent bars in the plurality of bars.

9. A foldable supporting frame comprising:
an upper frame comprising a plurality of bars, wherein adjacent bars in the plurality of bars are coupled to each other or integrally formed with each other at adjacent end portions thereof;
a plurality of legs disposed below the upper frame when unfolded to support the upper frame, wherein each of the plurality of legs is coupled with a corresponding bar in the plurality of bars and independently rotatable about an axis defined by the corresponding bar in the plurality of bars, wherein when folded, the plurality of legs are disposed in an interior defined by the upper frame;
a plurality of sliders, each movably disposed at one of a corresponding bar in the plurality of bars and a corresponding leg in the plurality of legs; and a plurality of oblique supports, each having a first end portion pivotally connected with a corresponding slider in the plurality of sliders and a second end portion pivotally connected with the other of the corresponding bar in the plurality of bars and the corresponding leg in the plurality of legs.

10. The foldable supporting frame of claim 9, further comprising a plurality of couplers to couple the plurality of legs with the upper frame, wherein each respective coupler in the plurality of couplers comprises a rotating portion rotatably coupled with a corresponding bar in the plurality of bars and a fixation portion fixedly coupled or integrally formed with the upper end portion of a corresponding leg in the plurality of legs.

11. The foldable supporting frame of claim 10, wherein at least a portion of the corresponding bar is circular, and the rotating portion of the respective coupler sleeves on the circular portion of the corresponding bar.

12. The foldable supporting frame of claim 11, wherein the rotating portion of the respective coupler comprises a split ring, a pair of semi-cylindrical shells, or a tube sleeving on the circular portion of the corresponding bar.

13. The foldable supporting frame of claim 12, wherein the pair of semi-cylindrical shells is coupled with each other through one or more lugs formed at each semi-cylindrical shell.

14. The foldable supporting frame of claim 11, wherein the rotating portion of the respective coupler comprises ribs on an interior circumferential surface of the rotating portion of the respective coupler to assist in rotation of the corresponding leg with respect to the corresponding bar.

15. The foldable supporting frame of claim 10, wherein the fixation portion of the respective coupler is inserted into the upper end portion of the corresponding leg, or the upper end portion of the corresponding leg is inserted into the fixation portion of the respective coupler.

16. The foldable supporting frame of claim 9, wherein the adjacent end portions of adjacent bars in the plurality of bars are welded together.

17. The foldable supporting frame of claim 9, wherein the adjacent end portions of adjacent bars in the plurality of bars are connected by a plurality of corner joints.

18. The foldable supporting frame of claim 17, wherein each respective corner joint in the plurality of corner joins has a first end portion inserted into one of the adjacent end portions of adjacent bars in the plurality of bars and a second end portion sleeved on the other of the adjacent end portions of adjacent bars in the plurality of bars.

19. The foldable supporting frame of claim 18, wherein:
the first end portion of each respective corner joint and the one of the adjacent end portions of adjacent bars in the plurality of bars are fixedly coupled with each other by a first fastener through holes formed thereof; and
the second end portion of each respective corner joint and the other of the adjacent end portions of adjacent bars in the plurality of bars are fixedly coupled with each other by a second fastener through holes formed thereof.

20. The foldable supporting frame of claim 19, further comprising a plurality of couplers to couple the plurality of legs with the upper frame, wherein:
each respective coupler in the plurality of couplers comprises a rotating portion sleeved on a corresponding bar in the plurality of bars at a position where the first end portion of a corner joint and the end portion of the corresponding bar are fixedly coupled; and
the rotating portion of the respective coupler comprises a slot on a side wall thereof, wherein the slot is operably coupled with the first fastener to prevent the respective coupler from sliding along the corresponding bar and to guide rotation of the corresponding leg about the axis defined by the corresponding bar.

\* \* \* \* \*